(12) United States Patent
Dixit et al.

(10) Patent No.: US 9,176,728 B1
(45) Date of Patent: Nov. 3, 2015

(54) GLOBAL SOFTWARE DEPLOYMENT/REMEDIATION MANAGEMENT AND ASSOCIATED ANALYTICS

(71) Applicant: BANK OF AMERICA CORPORATION, Charlotte, NC (US)

(72) Inventors: Amit Dixit, Hyderabad (IN); Syed Luqman Ahmed, New Delhi (IN); Nandakumar Malireddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/539,536

(22) Filed: Nov. 12, 2014

(51) Int. Cl.
*G06F 9/44* (2006.01)
*G06F 9/445* (2006.01)
*H04L 29/08* (2006.01)

(52) U.S. Cl.
CPC .. *G06F 8/65* (2013.01); *G06F 8/71* (2013.01); *H04L 67/10* (2013.01)

(58) Field of Classification Search
CPC ............... G06F 8/60; G06F 8/65; G06F 8/71; H04L 67/10
See application file for complete search history.

(56) References Cited

U.S. PATENT DOCUMENTS

| | | | | |
|---|---|---|---|---|
| 7,356,679 B1* | 4/2008 | Le | ..................... | G06F 17/30067 707/E17.01 |
| 2003/0061247 A1* | 3/2003 | Renaud | ..................... | G06F 8/61 |
| 2003/0078959 A1* | 4/2003 | Yeung | ..................... | G06F 8/62 709/201 |
| 2009/0037898 A1* | 2/2009 | Belisario | ..................... | G06F 8/20 717/169 |
| 2010/0242032 A1* | 9/2010 | Ladki | ..................... | G06F 8/71 717/171 |
| 2011/0055895 A1* | 3/2011 | Roskowski | ............. | H04W 4/02 726/3 |
| 2012/0324435 A1* | 12/2012 | Somani | ..................... | G06F 8/30 717/170 |
| 2013/0263112 A1* | 10/2013 | Fernandez-Ruiz | ... | G06F 9/5011 717/178 |
| 2014/0189676 A1* | 7/2014 | Mahajan | ..................... | G06F 8/43 717/170 |

\* cited by examiner

*Primary Examiner* — Chameli Das
(74) *Attorney, Agent, or Firm* — Michael A. Springs; Moore & Van Allen PLLC; James C. Edwards (57) ABSTRACT

Embodiments of the invention relate to systems, methods, and computer program products for an automated infrastructure management and remediation in an enterprise-type computing infrastructure that provides for automated deployment of critical updates/patches to enterprise-wide computing servers to insure that such updates occur and within prescribed time limits. Further, the invention provides for automatic extraction data from the various different data sources that contain data relevant to the update/patch process, consolidation and transformation of the data to accommodate reporting needs and analytical research and relying on the data to automatically determine the current state of the servers for the subsequent purpose of determining which of enterprise-wide servers require a pending update/patch. Additionally, the data is relied upon to automatically determine optimal times for deploying the update/patch to each of the servers, scheduling of an optimal time for deployment and subsequent automated deployment.

20 Claims, 5 Drawing Sheets

GLOBAL SOFTWARE DEPLOYMENT/REMEDIATION MANAGEMENT AND ASSOCIATED ANALYTICS

FIELD

In general, embodiments of the invention relate to, systems, apparatus and computer program products for computing network infrastructure remediation and more specifically globally managing the deployment of software updates/patches to networked servers via a centralized aggregation of data related to the servers.

BACKGROUND

In many large enterprises, computing servers or other networked devices are distributed globally across a diverse computing network infrastructure. The various servers deployed in the network implement many different operating systems that execute a myriad of different software packages, applications, tools and the like. In many instances a single server may host many different software packages, applications or the like.

In order to manage such a diverse and complex computing infrastructure, such enterprises typically employ support teams whose job is it to keep the systems running and insure that risk to the systems are minimized. Frequently operating system (OS)/software manufacturers will release updates, in the form of patches, service packs or the like, that serve to minimize vulnerabilities and risks to their respective OS or software application. In this regard, many of the system updates/patches are deemed to be critical in addressing security fixes and, as such, it is imperative that the updates/patches be deployed throughout the computing infrastructure in a timely fashion.

However, in large enterprises, with many different computing environments and business units/lines-of-business (LOBs), timely deployment of the updates/patches is highly problematic. This is because the data associated with servers, business units/LOBs and other data relevant to deploying the updates is spread across many different data sources; each of which must be constantly monitored to assess risk, vulnerabilities and the like. While many of these different data sources are capable of generating log files and creating reports that indicate the risk, in today's enterprise environment support teams members are tasked with the highly manual process of pulling the reports from the data sources/systems, consolidating/reformatting the data, and implementing diverse business rules to result in a final list of which servers require updates/patches and the schedule for deploying such updates/patches. The manual process is not only inefficient and time-consuming, negatively impacting the critical nature of the deployment process, but also is prone to human error, in which servers requiring updates/patches may be inadvertently overlooked.

Therefore, a need exists to automate the process of server remediation in an enterprise-type computing infrastructure, such that the deployment of critical updates/patches across all computing servers requiring such is ensured and occurs within prescribed time limits. In this regard, a need exists to automatically extract data from all of the different data sources that contain data relevant to the update/patch process and automatically consolidate and transform/reformat the data to accommodate reporting needs and analytical research. In addition, a need exists to automatically determine the current state of the servers and the OSs, applications running thereon, so as to determine which servers require a pending update/patch. Moreover, a need exists to automatically determine optimal times for deploying the update/patch to each of the servers requiring such, scheduling the servers for deployment and implementing the deployment.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for automated server management and remediation in an enterprise-type computing infrastructure. In accordance with the embodiments of the invention herein described the automated deployment of critical updates/patches to enterprise-wide computing servers insures that such updates occur and within prescribed time limits; thereby minimizing the overall risk to the servers and the computing infrastructure in general. Specifically, present embodiments of the invention automatically extract data from the various different data sources that contain data relevant to the update/patch process, once extracted the present invention automatically consolidates and transforms/reformats the data to accommodate reporting needs and analytical research.

Moreover, presently described embodiments of the invention, rely on the consolidated and transformed data to automatically determine the current state of the servers (i.e., the current version/update of the OSs, applications, tools and the like being executed on the servers) for the subsequent purpose of determining which of enterprise-wide servers require a pending update/patch. Additionally, present embodiments of the invention, rely on the consolidated and transformed data to automatically determine optimal times for deploying the update/patch to each of the servers so as to minimize down time and, through implementation of automated electronic communication to server-responsible entities, confirm and schedule an optimal time for deployment. Further, the present invention provides for automated deployment/installation of the updates/patches according to the scheduled deployment time.

Additionally, embodiments of the present invention provide the ability to generate reports and/or provide for a user-interface dashboard that illustrates update/patch deployment penetration in terms of domain/environment, business unit/LOB, application/tool, operating system, data center and the like. Further, the reports and/or dashboard may provide real-time data that allows users to assess the currently most vulnerable server, application/tool, data center and/or network segment (based on update/patch deployments that are outstanding).

An apparatus for globally managing computing network infrastructure remediation defines first embodiments of the invention. The apparatus includes a computing platform including a memory and at least one processor in communication with the memory. The apparatus further includes an infrastructure remediation module that is stored in the memory and executable by the processor. The module is configured to receive, from a plurality of data sources, data associated with a plurality of globally deployed computing servers in a networked infrastructure and, based on an indication that an updated version of a software application requires deployment, determine from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version. The module is further configured to determine, for each of the computing servers meeting the version pre-requisite, one or more recommended optimal (based on minimizing server downtime/increasing recoverability) dates and times for deploying the updated version of the specified software to the computing servers and generate and initiate communication of software update deployment notifications to each entity controlling each of the computing servers meeting the version pre-requisite. The notifications include the one or more recommended optimal dates and times for deploying the version. Further, the module is configured to, in response to communicating the notifications, receive a scheduling input from each of the entities that confirms or selects one of the recommended optimal dates and times for deploying the version, and deploy the updated version of the software application to each of the computing servers meeting the version pre-requisite in accordance with the scheduling inputs.

In specific embodiment of the apparatus, the infrastructure remediation module is further configured to consolidate and aggregate the received data into a standardized data format, wherein the standardized data format is used to generate infrastructure status reports and perform analytics. In such embodiments of the apparatus, performing analytics may further include segmenting the data according to one of software application, production environment/domain, operating system, data center and/or line-of-business (LOB).

In further specific embodiments of the apparatus, the infrastructure remediation module is configured to deploy requisite intermediary versions to each of the computing servers determined to not be meeting the version pre-requisite for installing the updated version.

In other specific embodiments of the apparatus, the infrastructure remediation module is configured to determine, for each of the computing servers meeting the version pre-requisite, an optimal ordered sequence for deploying the updated version based on a criticality level assigned to one or more of the plurality of servers implementing the software application.

In other specific embodiments of the apparatus, the infrastructure remediation module is further configured to determine, for each of the computing servers meeting the version pre-requisite, one or more recommended optimal dates and times for deploying the updated version, such that the determination provides for seeking to consolidate other pending downtime-related activities required to be performed on the computing server (e.g., mandatory server restarts) with the deployment of the updated version.

Additionally, in other specific embodiments of the apparatus, the infrastructure remediation module is further configured to update one or more systems of records after deployment of the updated version to reflect the updated version status and details related to the deployment.

Moreover, in still further specific embodiments of the apparatus, the infrastructure remediation module is further configured to provide a dashboard user-interface that indicates at least one of (1) current status of the deployment of the updated version per at least one of operating system or line-of-business, (2) an ordered listing of most vulnerable computing servers and (3) a quantity (i.e., finite number or percentage) of computing servers successfully and unsuccessfully updated over predetermined periods of time.

A computer program product that includes a non-transitory computer-readable medium defines second embodiments of the invention. The computer-readable medium includes a first set of codes for causing a computer to receive, from a plurality of data sources, data associated with a plurality of globally deployed computing servers in a networked infrastructure. In specific embodiments as further set of codes is configured to consolidate, transform/reformat the received data in a standardized format so as to facilitate the generation of reports and performing analytical analysis (e.g., segmenting data and the like)

The computer-readable medium additionally includes a second set of codes for causing a computing device to, based indication that an updated version of a software application requires deployment, determine from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version.

Additionally, the computer-readable medium includes a third set of codes for causing a computer to determine, for each of the computing servers meeting the version pre-requisite, one or more recommended optimal dates and times for deploying the updated version of the specified software to the computing servers requiring the update version and a fourth set of codes for causing a computer to generate and communicate software update deployment notifications to each entity controlling each of the computing servers meeting the version pre-requisite. The notifications include the one or more recommended optimal dates and times for deploying the version.

Further, the computer-readable medium includes a fifth set of codes for causing a computer to, in response to communicating the notifications, receive a scheduling input from each of the entities that confirms or selects one of the recommended optimal dates and times for deploying the version, and a sixth set of codes for causing a computer to deploy the updated version of the software application to each of the computing servers meeting the version pre-requisite in accordance with the scheduling inputs.

A method for globally managing computing network infrastructure remediation defines third embodiments of the invention. The method includes receiving, at a centralized computing device database, data associated with a plurality of globally deployed computing servers in a networked infrastructure that is communicated from a plurality of data sources. The method further includes, based on an indication that an updated version of a software application requires deployment, determining, from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version. Additionally, the method includes determining for each of the computing servers meeting the version pre-requisite, one or more recommended optimal dates and times for deploying the updated version of the specified software to the computing servers requiring the update version and generating and initiating electronic communication of, software update deployment notifications to each entity controlling each of the computing servers meeting the version pre-requisite. The notifications include the one or more recommended optimal dates and times for deploying the version. Further, the method includes, in response to communicating the notifications, receiving a scheduling input from each of the entities that confirms or selects one of the recommended optimal dates and times for deploying the version and deploying the updated version of the software application to each of the computing servers meeting the version pre-requisite in accordance with the scheduling inputs.

Thus, further details are provided below for systems, apparatus, methods and computer program products for automated computing infrastructure management and remediation in an enterprise-type computing environment. The invention provides for automated deployment of critical updates/patches to enterprise-wide computing servers to insure that such updates occur and within prescribed time limits. Embodiments described in more detail below, provide for automatically extracting data from the various different data sources that contain data relevant to the update/patch process, once extracted the present invention automatically consolidates and transforms/reformats the data to accommodate reporting needs and analytical research. The data is subsequently relied upon for automatically determining the current state of the servers and determining which of enterprise-wide servers require a pending update/patch. The automated features of present invention provide for a more efficient and less time-consuming means for deploying updates/patches.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as JAVA, PERL, SMALLTALK, C++, SAS or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention relate to systems, apparatus, methods, and computer program products for automated computing infrastructure management and remediation in an enterprise-type computing environment. In accordance with the embodiments of the invention herein described the automated deployment of critical updates/patches to enterprise-wide computing servers insures that such updates occur and within prescribed time limits; thereby minimizing the overall risk to the servers and the computing infrastructure in general.

Specific to embodiments of the present invention, data is automatically extracted from the various different data sources that contain data that is relevant to the update/patch process. Once extracted the present invention automatically consolidates and transforms/reformats the data to accommodate reporting needs and analytical research. Further, the data is subsequently relied upon to automatically determine the current state of the servers (i.e., the current version/update of the operating systems (OSs), applications, tools and the like being executed on the servers) for the purpose of determining which of enterprise-wide servers require a pending update/patch. Additionally, the data is relied upon to automatically determine optimal times for deploying the update/patch to each of the servers so as to minimize down time and, through implementation of automated electronic communication to server-responsible entities, confirm and schedule an optimal time for deployment. Further, the present invention provides for automated deployment/installation of the updates/patches according to the scheduled deployment time.

In addition to managing the deployment of updates and patches the present invention also provides for the ability to generate reports and/or a user-interface/dashboard that illustrates update/patch deployment penetration in terms of domain/environment, business unit/LOB, application/tool, operating system, data center and the like. Further, the reports and/or user-interface dashboard may provide real-time data that allows users to assess the currently most vulnerable server, application/tool, data center and/or network segment.

Figure 1:
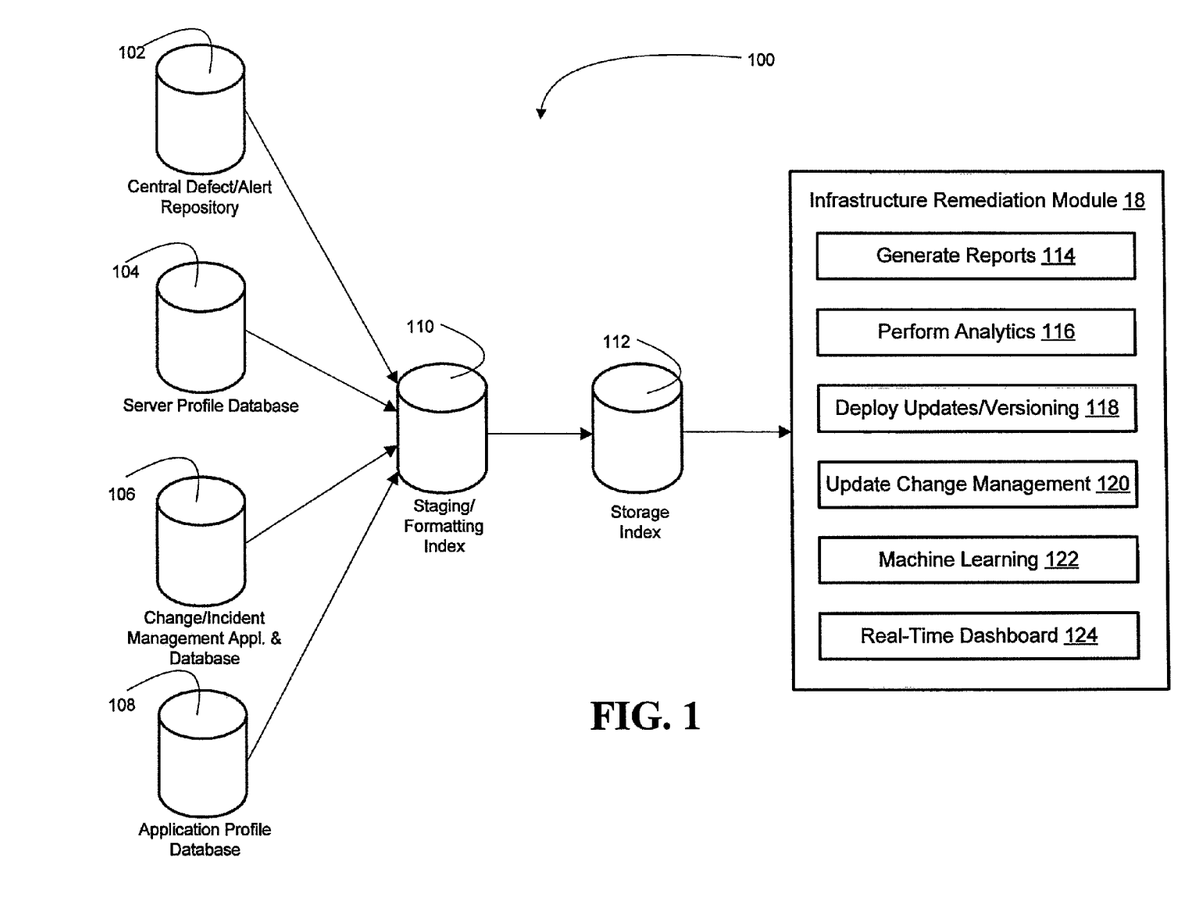
FIG. 1 is schematic diagram of a system for computing network infrastructure remediation and related analytic, in accordance with embodiments of the present invention.

FIG. 1 provides a schematic diagram of a system 100 configured for providing computing network infrastructure remediation in the form of software/OS updates/patches and corresponding reporting and analytics capabilities, in accordance with embodiments of the present invention. In accordance with the system 100, data associated with networked computing servers is automatically extracted from a plurality of different data sources and subsequently standardized, consolidated and used for update/patch deployment (i.e., versioning). As previously discussed, prior to the present invention various monitoring tools and manual processing of the data has been employed to gather the data, consolidate the data and generate reports associated with deployment of software updates/patches (i.e., which servers require update/patches and the like. Such manual processing, which requires the user to monitor/listen to numerous different channels of communication (i.e., data sources), is not conducive to the time sensitive deployment of software application updates/patches, which in a global enterprise may require thousands of servers to be updated in a short period of time.

In the illustrated embodiment of FIG. 1 four (4) data sources 102, 104, 106 and 108 are depicted for the sake of brevity, however; in other embodiments of the invention data is automatically extracted from many other additional data sources.

Data source 102 is a central defect/alert repository that stores information associated with the various defects identified by the scanning tools/applications implemented by the enterprise. In specific embodiments of the invention, the system 100 uses the data extracted from data source 102 to determine operating system (OS)-related vulnerabilities/defects that exist on computing servers. Data source 104 is a server profile database that stores data specific to the computing servers, such as server support contacts, operating system(s), applications/tools executing on the server, network and hardware information and the like. Data source 106 is a change management database and application that stores server controlling-entity data and is used by the system to schedule deployment of updates/patches. Data source 108 is an application profile database that stores data specific to the applications/tools being implemented on the servers, including application contacts (i.e., application controlling-entity) and the like.

Other data sources not shown in FIG. 1 may include (a) a central reports application database that assists in determining report criteria, report recipients and assist in scheduling update/patch deployment; (b) a server remediation application/database that stores information related to a server's normal change control window (i.e., period of time typically used to deploy an update/patch; (c) a global information security database that stores information all server vulnerabilities related to the OS, applications/tools executing on the server or any other risk/vulnerability; (d) a file-level security application that provides vulnerabilities at the file-level (e.g., if a particular file within an application/tool is associated with an outdated version of the application/tool); (e) risk and compliance guidelines that store that governance baselines and standards that are required to be met by the servers prior to production release and the guidelines to ensure that violations of the guidelines are remediated within established timeframes; (f) a server query application/database that allows user to query individual servers to determine the vulnerabilities/alerts currently associated with the server; and (g) an electronic mail database which may receive notifications from application providers regarding updates and the like.

System 100 additionally includes staging/formatting index 110 which receives the data from the data sources, consolidates/filters the data (where applicable) and formats the data into a standardize format. Data extraction may be configured to occur on a continuous ongoing basis, on a regularly scheduled basis or in response to notification of a pending update/patch deployment. In those embodiment in which the data is extracted on an continuous ongoing basis, such as in response to data being received by a corresponding data source, the data in the system is deemed to be "real-time" or "near-real-time" data that reflects the current state of the infrastructure;

as such any subsequent data reporting, analytics performed on the data and/or dashboard display of data may include "real-time" or "near-real-time" data.

Figure 2:
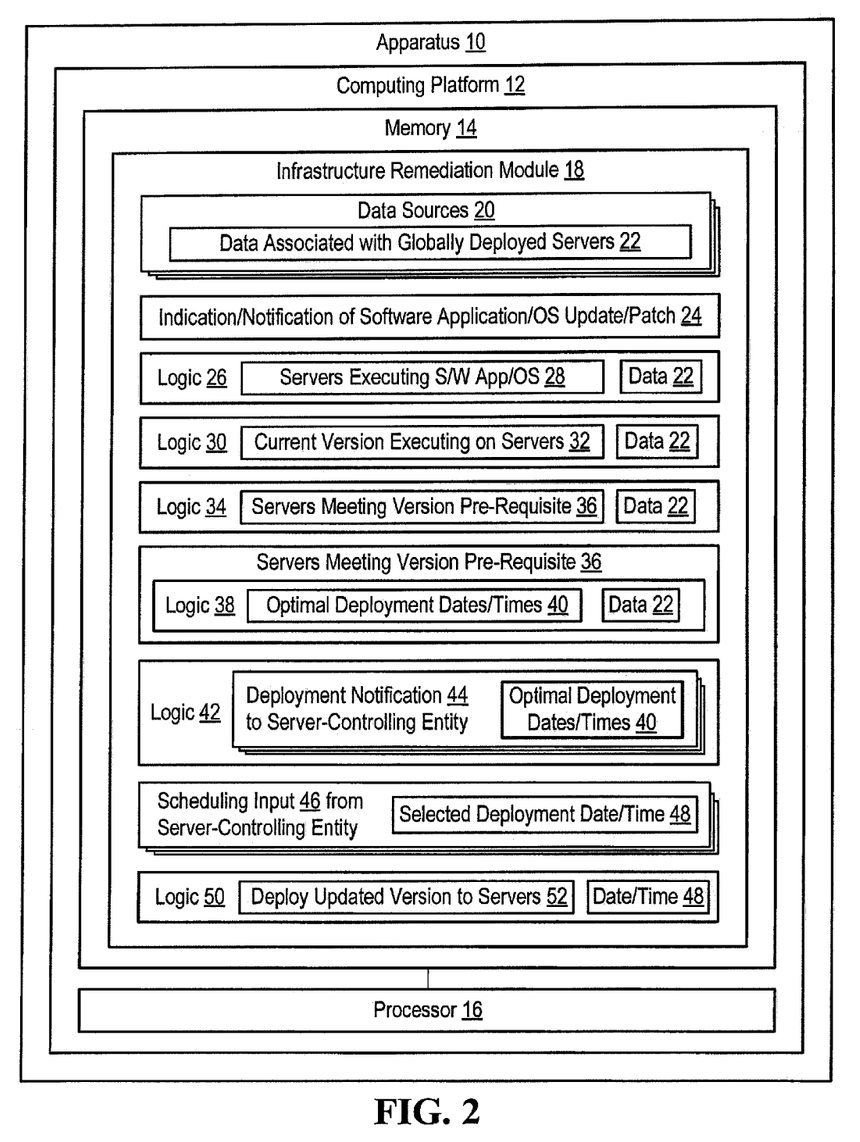
FIG. 2 is a block diagram of an apparatus configured for globally managing computing network infrastructure remediation, in accordance with embodiments of the present invention.
Figure 3:
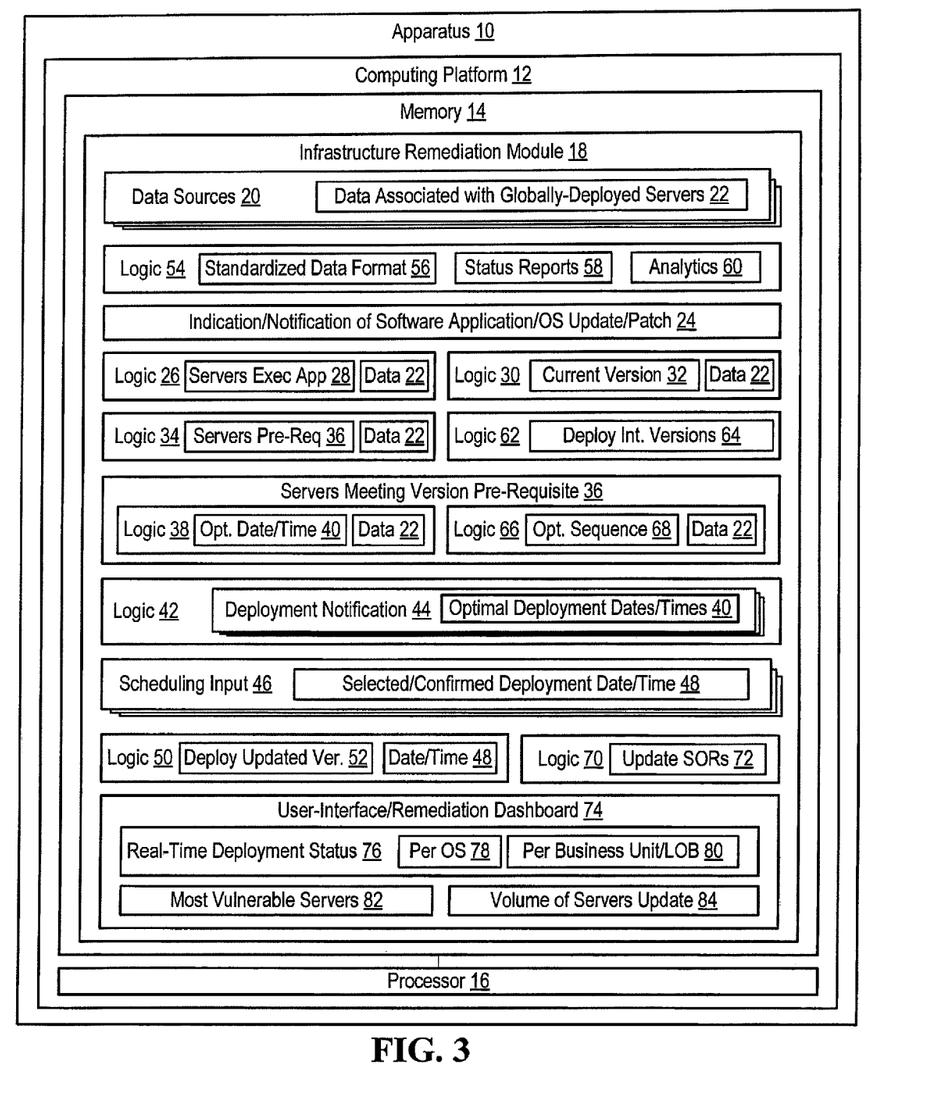
FIG. 3 is a block diagram of a more detailed apparatus configured for globally managing computing network infrastructure remediation in accordance with embodiments of the present invention.

Once the data has been received and properly formatted and consolidated/filtered, the data is stored at storage index 112 and infrastructure remediation module 18, which is discussed in further detail in relation to FIGS. 2 and 3, is implemented to generate reports 114, perform analytics 116, deploy updates/patches (i.e., versioning) 118, provide updates to change management 120, conduct machine (i.e., server) learning 122 and provide a dashboard utility 124. The infrastructure remediation module 18 may generate reports 114 automatically (e.g., in response to notification of a pending update/patch deployment) and/or at the bequest of user. Analytics 116 may be performed automatically or at the bequest of a user and may be performed prior to deployment of the update/patch (e.g., as part of the deployment scheduling process) or post-deployment. Pre-deployment analytics 116 may include segregating/segmenting servers and corresponding data on the basis of various scheduling factors. The scheduling factors may include, but are not limited to, server-controlling entity (e.g., change advisory board (CAB)), business unit/line-of-business (LOB), environment (e.g., quality assurance (QA), user-acceptance test (UAT), pre-production, production, contingency and the like), update/patch schedule (e.g., week and day), update/patch status or the like. Segregating/segmenting the data may be necessary to determine the list of servers for an update task.

As discussed infra. in relation to FIGS. 2 and 3, the infrastructure remediation module 18 determines which servers require updates schedules a deployment date/time and automatically deploy updates/patches (i.e., versioning) 118. Post-deployment of the updates/patches, the infrastructure remediation module 18 automatically provide updates to change management 120 systems of record (e.g., details of the update and the like), In addition, the infrastructure remediation module 18 is configured to learn from the software update process (i.e., machine learning 122), such that information from the update deployment may be subsequently used to schedule future updates (e.g., patterns of deployment days and/or times) and/or conduct future updates (e.g., patterns or instances of deployment failures or the like). Moreover, the infrastructure remediation module 18 may be configured to provide a dashboard utility that includes real-time deployment status data such current deployment status (e.g., per operating system, per business unit/LOB or the like), current volume of deployments and/or success rates, most vulnerable servers and the like.

Referring to FIG. 2, a block diagram is presented of an apparatus 10 configured for globally managing computing network infrastructure remediation, in accordance with embodiments of the present invention. The apparatus 10 includes a computing platform 12 having and a memory 14 and at least one processor 16 that is in communication with the memory. The memory 14 of apparatus 10 stores infrastructure remediation module 18, which is configured for automatically managing the deployment of software/OS updates/patches to globally-distributed servers in an enterprise-wide computing infrastructure.

Infrastructure remediation module 18 is configured to receive (i.e., extract, pull or the like), from various different data sources 20, data 22 associated with deploying software/OS updates/patches on globally distributed servers in an enterprise-wide computing network infrastructure. The data sources include data needed to schedule and implement the deployment of a software/OS update/patch such as, but not limited to, server profile data, application/OS profile data, server vulnerability data, normal server change/update window, operating system vulnerability data, application vulnerability/alerts data including file-level vulnerabilities, server controlling entities (i.e., remediation coordinators), application contacts, customer contacts, server contacts, network information and the like. The data 22 may be extracted from the data sources 20 on a continuous ongoing basis, on a regularly scheduled basis at the bequest of a module operator (e.g., in response to notification of a need to deploy a software/OS update/patch).

In response to an indication that an updated version/patch of a software application or OS requires deployment 24, the infrastructure remediation module 18 executes logic 26 that is configured to automatically determine, from the received data 22, which of the globally-distributed servers implement the software/OS 28 that is being updated/patched and logic 30 that is configured to automatically determine, from the received data 22, the current version of the software/OS being executed on the servers that implement the software/OS. Additionally, the infrastructure remediation module 18 executes logic 34 that automatically determines, from the received data 22 and based on the current version of the software/OS 32, which of the servers meet a version pre-requisite 36 for installing/deploying the updated version. In many instances an update/patch will require one or more previous updates/patches to have been installed on the server in order to accept the deployment of the current update/patch.

Further, infrastructure remediation module 18 executes logic 38 that is configured to automatically determine, for each server meeting the version pre-requisite requirements 36, one or more recommended optimal dates and/or times 40 for deploying the updated version/patch to the software application/OS. The determination of the recommended optimal dates and/or times 40 is based on the received data 22, such as data associated with previously deployed updates/patches (i.e., previous dates/times), currently scheduled server activities (e.g., scheduled downtime) and the like. The optimal dates and times are determined so as to minimize downtime and maximize recoverability. Additionally, infrastructure remediation module 18 executes logic 42 that is configured to automatically generate and initiate electronic communication of a software update deployment notification 44 (e.g., email or the like) that is sent to a server controlling-entity and includes the recommended optimal dates and/or times for deployment 40. In response to communicating the deployment notifications, the module 18 receives a scheduling input 46 from each of the server-controlling entities that confirms or selects one of the recommended optimal dates and times 48 for deploying the updated version.

Additionally, infrastructure remediation module 18 executes logic 50 that is configured to deploy the updated version/patch of the software application/OS to each of the computing servers meeting the version pre-requisite requirements in accordance with the scheduling input (i.e., the optimal date and time confirmed or selected by the server-controlling entity).

Referring to FIG. 3, shown is a more detailed block diagram of apparatus 10, in accordance with various other specific embodiments of the present invention. As previously noted in relation to the discussion of FIG. 2, the apparatus 10 is configured for automatically managing the deployment of software/OS updates/patches to globally-distributed servers in an enterprise-wide computing infrastructure. In addition to providing greater detail, FIG. 3 highlights various alternate and/or optional embodiments of the invention. The apparatus 10 may include one or more of any type of computing device.

The present apparatus and methods can accordingly be performed on any form of one or more computing devices.

The apparatus 10 includes computing platform 12 that can receive and execute algorithms, such as routines, and applications. Computing platform 12 includes memory 14, which may comprise volatile and non-volatile memory, such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, computing platform 12 also includes processor 16, which may be an application-specific integrated circuit ("ASIC"), or other chipset, processor, logic circuit, or other data processing device. Processor 16 or other processor such as ASIC may execute an application programming interface ("API") (not shown in FIG. 3) that interfaces with any resident programs, such as infrastructure remediation module 18 and routines associated therewith or the like stored in the memory 14 of the apparatus 10.

Processor 16 includes various processing subsystems (not shown in FIG. 3) embodied in hardware, firmware, software, and combinations thereof, that enable the functionality of apparatus 10 and the operability of the apparatus on a network. For example, processing subsystems allow for initiating and maintaining communications and exchanging data with other networked devices. For the disclosed aspects, processing subsystems of processor 14 may include any subsystem used in conjunction with infrastructure remediation module 18 and related algorithms, sub-algorithms, sub-modules thereof.

Computer platform 12 may additionally include communications module (not shown in FIG. 3) embodied in hardware, firmware, software, and combinations thereof, that enables communications among the various components of the apparatus 10, as well as between the other networked devices. Thus, communication module may include the requisite hardware, firmware, software and/or combinations thereof for establishing and maintaining a network communication connection.

As previously discussed in relation to FIG. 2, the memory 14 of apparatus 10 stores infrastructure remediation module 18 that is configured to globally managing computing network infrastructure remediation, in accordance with embodiments of the present invention. The module 18 is configured to extract, from various different data sources 20, data 22 associated with deploying software/OS updates/patches on globally distributed servers in an enterprise-wide computing network infrastructure. In specific embodiments of the invention the remediation module 18 includes logic 54 that is configured to re-format the data 56 to a standardized format based on the data sources implementing diverse systems of record. In addition to reformatting the data the data may be consolidated/filtered to eliminate redundant data and/or data that is not relevant to subsequent processing. Reformatting the data 56 to a standardized format is required for subsequent generation of reports 58 and performing analytics 60 on the data. Consolidating/filtering the data may additionally include segmenting the data according to software application, production environment, operating system, business unit/LOB or the like for the purpose of identifying a list of servers for a specified pending deployment task.

As previously discussed, in response to receiving a direct or indirect indication that an updated version/patch of a software application or OS requires deployment 24, the infrastructure remediation module 18 executes logic 26 that is configured to automatically determine, from the received data 22, which of the globally-distributed servers implement the software/OS 28 that is being updated/patched and logic 30 that is configured to automatically determine, from the received data 22, the current version of the software/OS being executed on the servers that implement the software/OS. Additionally, the infrastructure remediation module 18 executes logic 34 that automatically determines, from the received data 22 and based on the current version of the software/OS 32, which of the servers meet a version pre-requisite 36 for installing/deploying the updated version. In many instances an update/patch will require one or more previous updates/patches to have been installed on the server in order to accept the deployment of the current update/patch.

In specific embodiments of the invention, the infrastructure remediation module 18 executes logic 62 is configured to schedule and deploy intermediary versions 64 to each of the servers determined to meet the version pre-requisites for installing the current updated version. In such embodiments of the invention, the infrastructure remediation module 18 may determine which intermediary versions (i.e., previously deployed updates/patches) need to installed on a specified server, schedule the deployment of the intermediary versions (either in conjunction with the current update/patch or at a separate date and time) and implement the deployment of the intermediary versions as a means of meeting the version pre-requisites prior to deploying the current update/patch.

Further, infrastructure remediation module 18 executes logic 38 that is configured to automatically determine, for each server meeting the version pre-requisite requirements 36, one or more recommended optimal dates and/or times 40 for deploying the updated version/patch to the software application/OS. The determination of the recommended optimal dates and/or times 40 is based on the received data 22, such as data associated with previously deployed updates/patches (i.e., previous dates/times), currently scheduled server activities (e.g., scheduled downtime) and the like. In this regard, the infrastructure remediation module 18 may consolidate update deployment with other scheduled or pending activities so as to minimize downtime.

In additional specific embodiments of the invention, the infrastructure remediation module 18 may execute logic 66 that is configured to determine, for each of a plurality of servers meeting the version pre-requisite, an optimal order/sequence 68 for deploying the updated the updated version. The optimal order sequence 68 is based on the received data 22, including but not limited to data that reflects the criticality level of the server, in which "criticality" may be defined in terms of the importance of the server in the enterprise and/or the current vulnerable state of the state.

Additionally, infrastructure remediation module 18 executes logic 42 that is configured to automatically generate and initiate electronic communication of a software update deployment notification 44 (e.g., email or the like) that is sent to a server controlling-entity and includes the recommended optimal dates and/or times for deployment 40. In response to communicating the deployment notifications, the module 18 receives a scheduling input 46 from each of the server-controlling entities that confirms or selects one of the recommended optimal dates and times 48 for deploying the updated version. Additionally, infrastructure remediation module 18 executes logic 50 that is configured to deploy the updated version/patch of the software application/OS to each of the computing servers meeting the version pre-requisite requirements in accordance with the scheduling input (i.e., the optimal date and time confirmed or selected by the server-controlling entity).

Moreover, in specific embodiments of the invention, the infrastructure remediation module 18 executes logic 70 that is configured to update various systems of record (SORs) 72 with server-specific details of the software update deployment, as well as, recording the updated version of the software application/OS deployed on the server for the purpose of change management. Additionally, infrastructure remediation module is configured to execute logic (not shown in FIG. 3) that is configured to learn based on previously scheduled deployment dates/times (i.e., identify deployment date/time patterns for determining subsequent optimal dates/times) and/or previous success/failed deployment of updates (i.e., identify reasons for deployment failure and the like).

In additional embodiments of the invention, the infrastructure remediation module 18 provides for a user-interface/remediation dashboard 74 that is configured to provide a user real-time status and statistics associated with a software/OS update/patch deployment. An example of such a dashboard is shown and described in relation to FIG. 5, infra. The data provide in the user-interface dashboard may include, but is not limited to real-time deployment status 76 (e.g., percentage of updates/patches currently deployed). In specific embodiments, the deployment status presented in the dashboard may be further delineated by a specific deployment category, such as operating system 78, business unit/LOB 80 or the like. Further, the user-interface/dashboard may be configured to display a listing of the most vulnerable servers 82 in the computing infrastructure and the volume of servers currently updated successfully and/or unsuccessfully 84.

Figure 4:
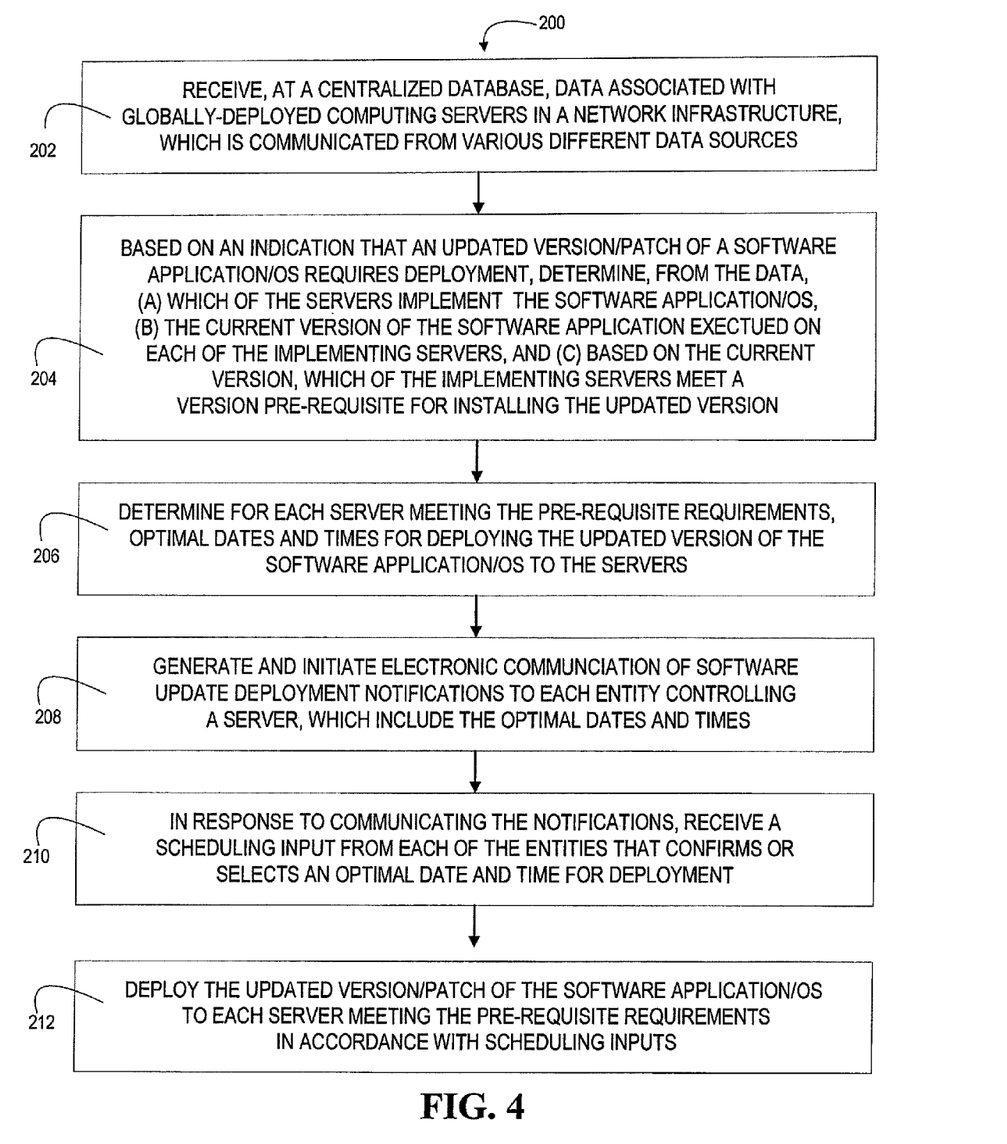
FIG. 4 is a flow diagram of a method for globally managing computing network infrastructure remediation, in accordance with embodiments of the present invention.

Referring to FIG. 4. A flow diagram is depicted of a method 200 for automatically managing the deployment of software/OS updates/patches to globally-distributed servers in an enterprise-wide computing infrastructure, in accordance with embodiments of the present invention. At Event 202 data associated with deploying software/OS updates/patches on globally distributed servers in an enterprise-wide computing network infrastructure is received (i.e., extract, pull or the like), from various different data sources. The data is received at centralized database where is it subsequently reformatted into a standardized format and filtered/consolidated for the purpose of automatically determining update deployment schedules and/or managing the automated deployment of updates/patches and/or generating reports and/or performing analytics on the data. The data sources include data needed to schedule and implement the deployment of a software/OS update/patch such as, but not limited to, server profile data, application/OS profile data, server vulnerability data, normal server change/update window, operating system vulnerability data, application vulnerability/alerts data including file-level vulnerabilities, server controlling entities (i.e., remediation coordinators), application contacts, customer contacts, server contacts, network information and the like.

At Event 204, in response to an indication that an updated version/patch of a software application or OS requires deployment, the received data is used to determine (a) which of the globally-distributed servers implement the software/OS that is being updated/patched, (b) the current version of the software/OS being executed on the servers that implement the software/OS and, (c) based on the current version of the software/OS, which of the servers meet a version pre-requisite for installing/deploying the updated version. As previously noted, in many instances an update/patch will require one or more previous updates/patches to have been installed on the server in order to accept the deployment of the current update/patch.

At Event 206, for each server meeting the version pre-requisite requirements, one or more recommended optimal dates and/or times for deploying the updated version/patch to the software application/OS are determined. The determination of the recommended optimal dates and/or times is based on the received data, such as data associated with previously deployed updates/patches (i.e., previous dates/times), currently scheduled server activities (e.g., scheduled downtime) and the like. The optimal dates and times are determined so as to minimize downtime and maximize recoverability.

At Event 208, software update deployment notifications (e.g., email or the like) are generated and the electronic communication of such to a server controlling-entity is initiated. The notifications include the recommended optimal dates and/or times for deployment. At Event 210, in response to communicating the deployment notifications, a scheduling input is received, from each of the server-controlling entities that confirms or selects one of the recommended optimal dates and times for deploying the updated version.

At Event 212, the updated version/patch of the software application/OS is deployed/installed on each of the computing servers meeting the version pre-requisite requirements in accordance with the scheduling input (i.e., the optimal date and time confirmed or selected by the server-controlling entity).

Figure 5:
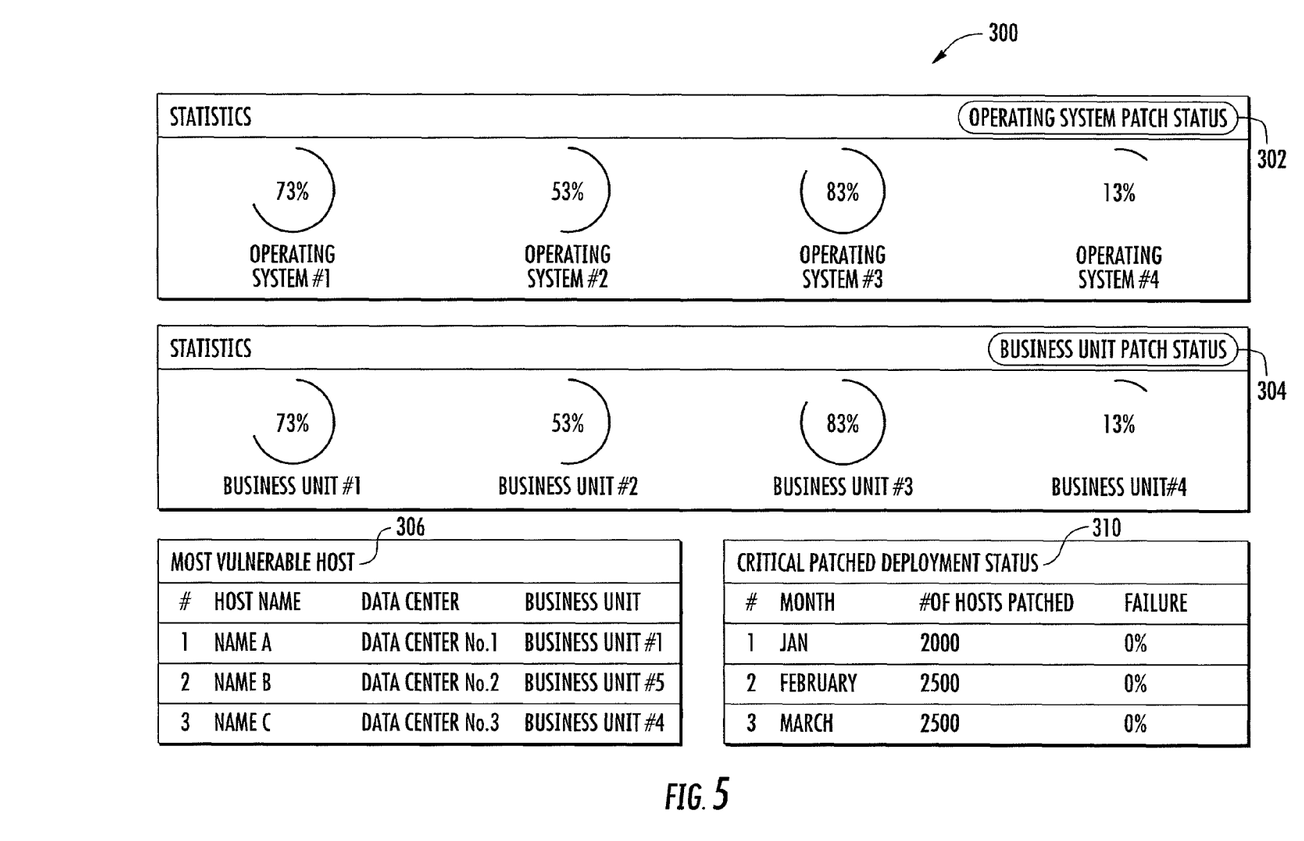
FIG. 5 is a schematic diagrams of a user-interface/dashboard configured for providing users versioning/updating status of networked servers, in accordance with embodiments of the present invention.

Referring to FIG. 5 a schematic diagram is presented that depicts an exemplary deployment status user-interface/dashboard 300, in accordance with embodiments of the present invention. It should be noted that the dashboard shown in FIG. 5 is by way of example only and, as such, other dashboards may be configured to display other relevant software/OS update deployment status data. The dashboard 300 is configured to display patch update status per operating system 302. In the illustrated example, the patch/update has been deployed on 73% of the servers implementing operating system No. 1: 53% of the servers implementing operating system No. 2; 83% of the servers implementing operating system No. 3; and 13% of the servers implementing operating system No. 4. Further, the dashboard 300 is configured to display patch update status per business unit/LOB 304. In the illustrated the patch/update has been deployed on 73% of the servers in business unit No. 1: 53% of the servers in business unit No. 2; 83% of the servers in business unit No. 3; and 13% of the servers in business unit No. 4.

Additionally, the dashboard 300 is configured to display a ranked listing of the most vulnerable servers 306 including the server name, the data center/location associated with the server and the business unit/LOB assigned to the server. Moreover, the dashboard 300 is configured to display a monthly breakdown of the critical patches/updates deployed 310 including the quantity of servers updated/patched in a listed month and the percentage of update failures occurring during the listed month.

Thus, present embodiments herein disclosed provide for automated computing infrastructure management and remediation in an enterprise-type computing environment. The invention provides for automated deployment of critical updates/patches to enterprise-wide computing servers to insure that such updates occur and within prescribed time limits. Embodiments described in more detail below, provide for automatically extracting data from the various different data sources that contain data relevant to the update/patch process, once extracted the present invention automatically consolidates and transforms/reformats the data to accommodate reporting needs and analytical research. The data is subsequently relied upon for automatically determining the current state of the servers and determining which of enterprise-wide servers require a pending update/patch. The automated features of present invention provide for a more efficient and less time-consuming means for deploying updates/patches.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for globally managing computing network infrastructure remediation, the apparatus comprising:
a computing platform including a memory and at least one processor in communication with the memory; and
an infrastructure remediation module stored in the memory, executable by the processor and configured to:
receive, from a plurality of data sources, data associated with deploying software updates on a plurality of globally distributed computing servers in a networked infrastructure;
based on an indication that an updated version of a software application requires deployment, determine from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version;
determine, for each of the computing servers meeting the version pre-requisite, one or more recommended optimal dates and times for deploying the updated version of the determined software application to the computing servers requiring the update version;
generate and initiate communication of software update deployment notifications to each entity controlling each of the computing servers meeting the version pre-requisite, wherein the notifications include the one or more recommended optimal dates and times for deploying the updated version;
in response to communicating the notifications, receive a scheduling input from each of the entities that confirms or selects one of the recommended optimal dates and times for deploying the updated version; and
deploy the updated version of the software application to each of the computing servers meeting the version pre-requisite in accordance with the scheduling inputs.

2. The apparatus of claim 1, wherein the infrastructure remediation module is further configured to consolidate and aggregate the received data into a standardized data format, wherein the standardized data format is used to generate infrastructure status reports and perform analytics.

3. The apparatus of claim 2, wherein the infrastructure remediation module is further configured to perform the analytics on the standardized formatted data by segmenting the data according to one of software application, production environment, operating system, and line-of-business (LOB).

4. The apparatus of claim 1, wherein the infrastructure remediation module is further to configured to deploy requisite intermediary versions to each of the computing servers determined to not be meeting the version pre-requisite for installing the updated version.

5. The apparatus of claim 1, wherein the infrastructure remediation module is further configured to determine, for each of the computing servers meeting the version pre-requisite, an optimal ordered sequence for deploying the updated version based on a criticality level assigned to one or more of the plurality of servers implementing the software application.

6. The apparatus of claim 1, wherein the infrastructure remediation module is further configured to determine, for each of the computing servers meeting the version pre-requisite, one or more recommended optimal dates and time for deploying the updated version, wherein the determination is based on minimizing computing server downtime.

7. The apparatus of claim 1, wherein the infrastructure remediation module is further configured to determine, for each of the computing servers meeting the version pre-requisite, one or more recommended optimal dates and times for deploying the updated version, wherein the determination provides for seeking to consolidate other pending downtime-related activities required to be performed on the computing server with the deployment of the updated version.

8. The apparatus of claim 1, wherein the infrastructure remediation module is further configured to update one or more systems of records after deployment of the updated version to reflect the updated version status and details related to the deployment.

9. The apparatus of claim 1, wherein the infrastructure remediation module is further configured to provide a dashboard user-interface that indicates a current status of the deployment of the updated version per at least one of operating system or line-of-business.

10. The apparatus of claim 1, wherein the infrastructure remediation module is further configured to provide a dashboard user-interface that indicates one or more of (1) an ordered listing of most vulnerable computing servers and (2) quantity of computing servers successfully and unsuccessfully updated over predetermined periods of time.

11. A computer program product including a non-transitory computer-readable memory device comprising:
a first set of codes for causing a computer to receive, from a plurality of data sources, data associated with deploying software updates on a plurality of globally distributed computing servers in a networked infrastructure;
a second set of codes for causing a computing device to, based indication that an updated version of a software application requires deployment, determine from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version;
a third set of codes for causing a computer to determine, for each of the computing servers meeting the version pre-requisite, one or more recommended optimal dates and times for deploying the updated version of the determined software application to the computing servers requiring the update version;

a fourth set of codes for causing a computer to generate and communicate software update deployment notifications to each entity controlling each of the computing servers meeting the version pre-requisite, wherein the notifications include the one or more recommended optimal dates and times for deploying the updated version;

a fifth set of codes for causing a computer to, in response to communicating the notifications, receive a scheduling input from each of the entities that confirms or selects one of the recommended optimal dates and times for deploying the updated version; and a sixth set of codes for causing a computer to deploy the updated version of the software application to each of the computing servers meeting the version pre-requisite in accordance with the scheduling inputs.

12. The computer program product of claim 11, wherein the computer-readable memory device further includes a seventh set of codes for causing a computer to (1) consolidate and aggregate the received data into a standardized data format, (2) generate infrastructure status reports, and (3) perform analytics.

13. The computer program product of claim 12, wherein the seventh set of codes is further configured to cause the computer to perform the analytics on the standardized formatted data by segmenting the data according to one of software application, production environment, operating system, and line-of-business (LOB).

14. The computer program product of claim 11, wherein the second set of codes is further configured to cause the computer to deploy requisite intermediary versions to each of the computing servers determined to not be meeting the version pre-requisite for installing the updated version.

15. The computer program product of claim 11, wherein the third set of codes is further configured to cause the computer to determine, for each of the computing servers meeting the version pre-requisite, an optimal ordered sequence for deploying the updated version based on a criticality level assigned to one or more of the plurality of servers implementing the software application.

16. The computer program product of claim 11, wherein the third set of codes is further configured to cause the computer to determine, for each of the computing servers meeting the version pre-requisite, the one or more recommended optimal dates and time for deploying the updated version based on minimizing computing server downtime.

17. The computer program product of claim 11, wherein the third set of codes is further configured to cause the computer to determine, for each of the computing servers meeting the version pre-requisite, the one or more recommended optimal dates and time for deploying the updated version, wherein the determination provides for seeking to consolidate other pending downtime-related activities required to be performed on the computing server with the deployment of the updated version.

18. The computer program product of claim 11, wherein the computer-readable memory device further includes a seventh set of codes for causing a computer to provide a dashboard user-interface that indicates at least one of (1) a current status of the deployment of the updated version per at least one of operating system or line-of-business, (2) an ordered listing of most vulnerable computing servers, and (2) a quantity of computing servers successfully and unsuccessfully updated over predetermined periods of time.

19. A method for globally managing computing network infrastructure remediation, the method comprising:

receiving, at a centralized computing device database, data associated with deploying software updates on a plurality of globally distributed computing servers in a networked infrastructure that is communicated from a plurality of data sources;

based on an indication that an updated version of a software application requires deployment, determining, by a computing device processor, from the data (a) which of the plurality of computing servers implement the software application, (b) a current version of the software application being executed on each of the computing servers that implement the software application, and (c) based on the current version, which of the plurality of computing servers that implement the software application meet a version pre-requisite for installing the updated version;

determining, by a computing device processor, for each of the computing servers meeting the version pre-requisite, one or more recommended optimal dates and times for deploying the updated version of the determined software application to the computing servers requiring the update version;

generating, by a computing device processor, and initiating electronic communication of, software update deployment notifications to each entity controlling each of the computing servers meeting the version pre-requisite, wherein the notifications include the one or more recommended optimal dates and times for deploying the updated version;

in response to communicating the notifications, receiving, by a computing device processor, a scheduling input from each of the entities that confirms or selects one of the recommended optimal dates and times for deploying the updated version; and deploying, by a computing device processor, the updated version of the software application to each of the computing servers meeting the version pre-requisite in accordance with the scheduling inputs.

20. The method of claim 19, further comprising:

consolidating and aggregating, by a computing device, the received data into a standardized data format;

generating, by a computing device processor, infrastructure status reports based on the standardized formatted data; and performing, by a computing device processor, analytics on the standardized formatted data.

\* \* \* \* \*